United States Patent [19]
Weingarten

[11] Patent Number: 5,383,646
[45] Date of Patent: Jan. 24, 1995

[54] DIAPHRAGM CONTROL VALVE

[75] Inventor: Zvi Weingarten, Kibbutz Evron, Israel

[73] Assignee: Bermad, Kibbutz Evron, Israel

[21] Appl. No.: 183,933

[22] Filed: Jan. 21, 1994

Related U.S. Application Data

[63] Continuation of Ser. No. 564,358, Aug. 8, 1990.

[30] Foreign Application Priority Data

Dec. 22, 1989 [IL] Israel ........................ 92851

[51] Int. Cl.$^6$ ............................ F16K 31/126
[52] U.S. Cl. ................. 251/61.1; 251/30.02; 251/61.4; 251/331
[58] Field of Search .............. 251/61.1, 331, 30.02, 251/61.2, 61.4, 63.5, 63.6, 46

[56] References Cited

U.S. PATENT DOCUMENTS

| | | | |
|---|---|---|---|
| 2,638,127 | 5/1953 | Griswold | 251/331 |
| 2,939,725 | 6/1960 | Graham . | |
| 2,963,266 | 12/1960 | Boteler | 251/331 |
| 3,073,490 | 1/1963 | Dahl et al. | 251/331 X |
| 3,468,511 | 9/1969 | Haskins . | |
| 4,244,554 | 1/1981 | DiMauro et al. | 251/61.1 |
| 4,316,482 | 2/1982 | Pearce et al. | 251/331 |
| 4,505,450 | 3/1985 | Saarem et al. | 251/24 |
| 4,653,526 | 3/1987 | Hoiss | 251/331 X |
| 4,703,775 | 11/1987 | Pastrone | 251/331 X |

FOREIGN PATENT DOCUMENTS

| | | |
|---|---|---|
| 7292774 | 3/1976 | Australia . |
| 2310077 | 9/1978 | Australia . |
| 6088680 | 4/1982 | Australia . |
| 4322385 | 12/1985 | Australia . |
| 7972287 | 4/1988 | Australia . |
| 2836244 | 6/1980 | Germany . |
| 3444865 | 12/1986 | Germany . |
| 0304128 | 6/1952 | Switzerland . |

*Primary Examiner*—Martin P. Schwadron
*Assistant Examiner*—Kevin L. Lee
*Attorney, Agent, or Firm*—Benjamin J. Barish

[57] ABSTRACT

A diaphragm control valve includes a diaphragm valve member having an outer peripheral section for securing the diaphragm within the valve housing, a valve-closer section displaceable with respect to the valve seat for controlling the flow, an intermediate flexible section permitting the displacement of the valve-closer section, and a cylindrical guiding section between the valve-closer section and the intermediate flexible section. The housing includes a cylindrical guiding surface engageable with the cylindrical guiding section of the diaphragm and with the valve-closer section for guiding the movement of the valve-closer section.

14 Claims, 3 Drawing Sheets

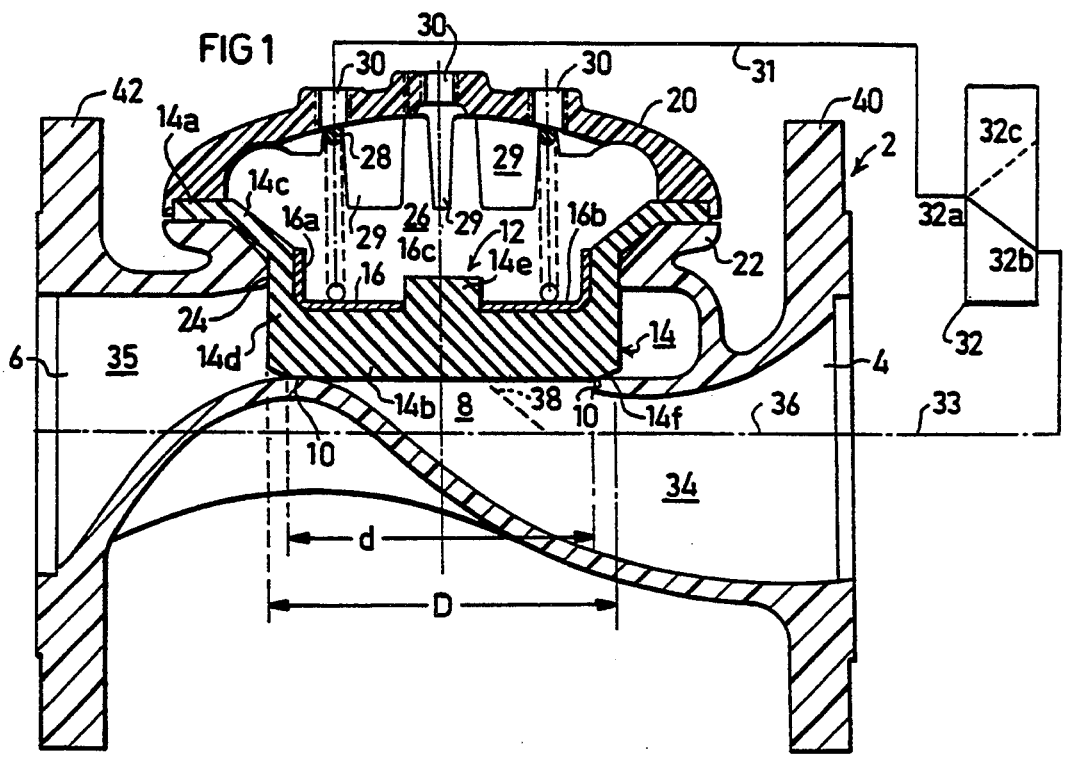
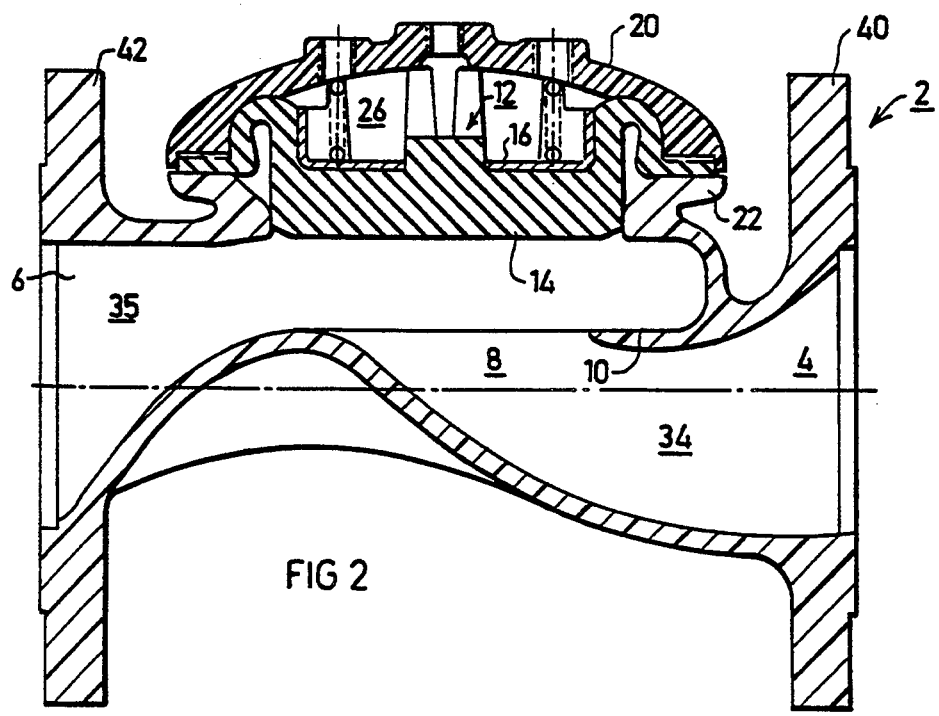

DIAPHRAGM CONTROL VALVE

This application is a continuation of application Ser. No. 07/564,358, filed Aug. 8, 1990.

FIELD AND BACKGROUND OF THE INVENTION

The present invention relates to diaphragm valves, such as are used as shut-off valves, as well as flow-responsive or pressure-responsive regulator valves.

A large number of shut-off or regulator valves have been developed. One type, commonly called the globe-type because of the global shape of its housing, typically includes a valve member movable by a stem, and/or the pressure in a control chamber, towards or away from the valve seat. Such a valve generally involves an abrupt change in the direction of the flow when passing through it, and is therefore usually characterized by relatively high pressure drops, turbulence, and other poor flow characteristics. Another type of known valve, commonly called the Y-pattern type, produces less of a change in the flow direction, and therefore has better flow characteristics, but is more difficult to manufacture. In addition, both of the above types of valves generally produce a high degree of "chatter" during the closing of the valve.

OBJECTS AND BRIEF SUMMARY OF THE INVENTION

An object of the present invention is to provide a valve having advantages in the above respects.

According to the present invention, there is provided a diaphragm valve comprising a housing having an inlet, an outlet, and a passageway circumscribed by a valve seat for the flow of fluid from the inlet to the outlet; and a valve member including a diaphragm within the housing and displaceable towards or away from the valve seat to control the flow therethrough. The diaphragm includes an outer peripheral section secured over an opening in the housing in alignment with the valve seat, a valve-closer section displaceable with respect to the valve seat for controlling the flow therethrough, an intermediate flexible section permitting the displacement of the valve-closer section, and a cylindrical guiding section between the valve-closer section and the intermediate flexible section. The housing includes a wall defining a control chamber between it and the diaphragm, and means for pressurizing the control chamber to thereby displace the valve-closer section of the diaphragm towards the valve seat. The housing further includes a cylindrical guiding surface between the opening in the housing and the valve seat, and engageable with the cylindrical guiding section of the diaphragm for guiding the movement of the valve-closer section of the diaphragm. The cylindrical guiding section of the diaphragm is sufficiently resilient such that when the control chamber is pressurized to displace the valve-closure section towards the valve seat, the differential pressure between the control chamber and said outlet displaces the resilient guiding section outwardly to cause it to be firmly pressed against the cylindrical guiding section of the housing, and thereby to restrain the valve-closure section from vibrating or from slamming to a closed position.

According to further features in the preferred embodiment of the invention described below, the diaphragm is a single unit of elastomeric material integrally formed with the above sections.

According to additional features in the described preferred embodiment, the valve member further includes a rigid insert having a cylindrical side wall engaging the inner surface of the cylindrical guiding section of the diaphragm, and a circular end wall engaging the inner surface of the valve-closer section of the diaphgram; also, the inner surface of the valve-closer section of the diaphragm is formed with a central projection, and the end wall of the rigid insert is formed with a hole receiving the central projection.

According to a still further feature in the described preferred embodiment, the valve-closer section of the diaphragm is bevelled on its lower outer surface.

According to a still further feature in the described preferred embodiment, the housing is formed with a converging throat section immediately upstream of the passageway, and with a diffuser section immediately downstream of the passageway.

Valves constructed in accordance with one or more of the foregoing features provide a number of important advantages over previously-known globe type valve constructions. Thus, the cylindrical guiding section of the diaphgram, engageable with the cylindrical guiding surface of the housing, stabilizes the movements of the diaphragm, which is particularly important during the final closing movement to minimize chatter. This guiding movement is enhanced when the cylindrical guiding section is made resilient so as to be firmly pressed against the cylindrical guiding surface of the housing by the differential pressure over the valve, as described above.

The guiding movements of the diaphgram are further enhanced by the provision of the rigid insert. The rigid cylindrical side wall of the insert not only aids in guiding the movements of the diaphragm towards and away from the valve seat, but also substantially reduces the tendency of the diaphragm to move in the downstream direction during the closing movements of the valve. The downstream movement of the valve-closer section is further resisted by the central projection in the inner surface of the valve-closer section of the diaphragm received within the hole formed in the end wall of the rigid insert.

A further advantage is provided by the bevelled outer surface of the valve-closer section of the diaphragm. Thus, with this bevelled surface, the closing pressure applied to the diaphragm produces a concentration of forces of annular configuration at the juncture of this bevel with the remaining surface of the valve-closer section of the diaphragm. This annular concentration of forces is produced during the final closing movements but is not present during the normal valve operation. It therefore acts somewhat like an annular projecting surface effecting a good seal with the valve seat during the closing of the valve, without the disadvantage of the conventional annular projecting seat which interferes with the fluid flow during the normal operation of the valve.

A still further advantage is provided by forming the converging throat section immediately upstream of the passageway at an angle of 35°–45°, preferably about 40°, with respect to the common axis of the housing inlet and outlet. Such a construction produces relatively good flow characteristics, having less turbulence and a smaller pressure drop, than the conventional globe type valves.

A still further advantage in the novel valve construction having the foregoing features is that the valve can be manufactured in volume and at relatively low cost.

Further features and advantages of the invention will be apparent from the description below.

BRIEF DESCRIPTION OF THE DRAWINGS

The invention is herein described, by way of example only, with reference to the accompanying drawings, wherein:

FIG. 1 is a transverse sectional view illustrating one form of diaphragm valve constructed in accordance with the present invention, the valve being in its closed position;

FIG. 2 is a view similar to that of FIG. 1 but illustrating the valve in its open position;

DESCRIPTION OF PREFERRED EMBODIMENTS

The Valve of FIGS. 1-4

Figure 3:
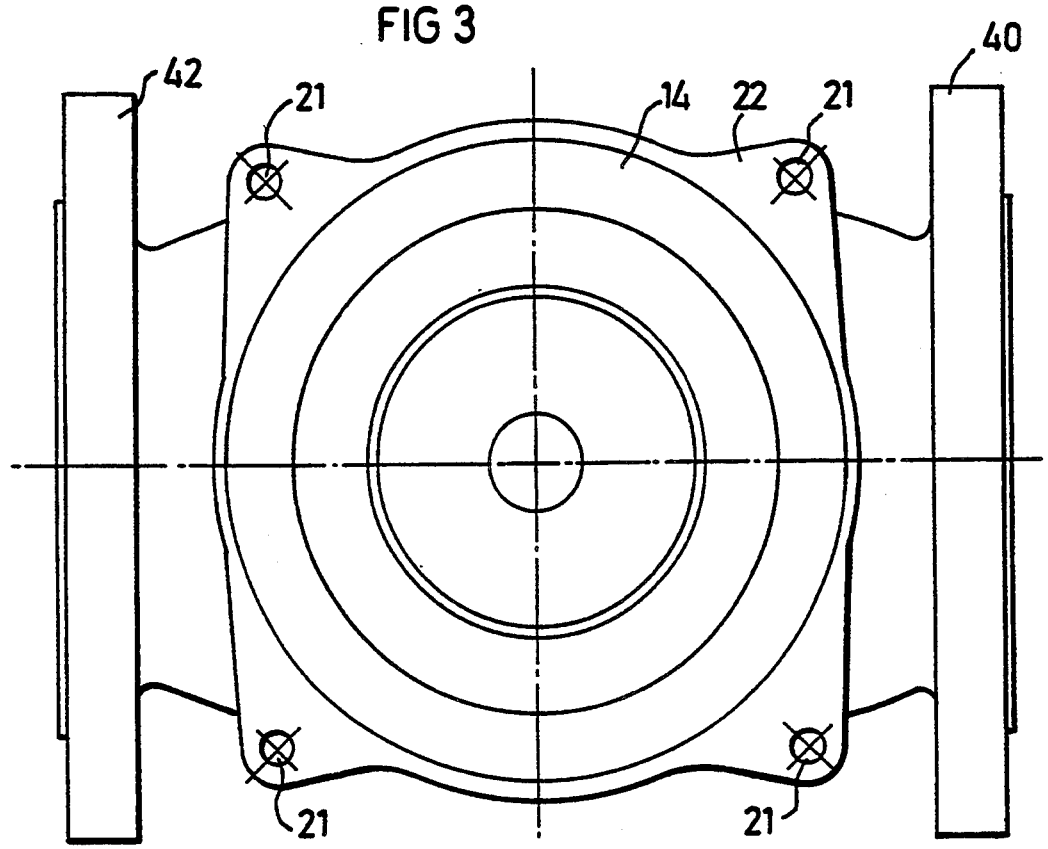
FIG. 3 is a top view illustrating the valve of FIGS. 1 and 2 with the cover removed.
Figure 4:
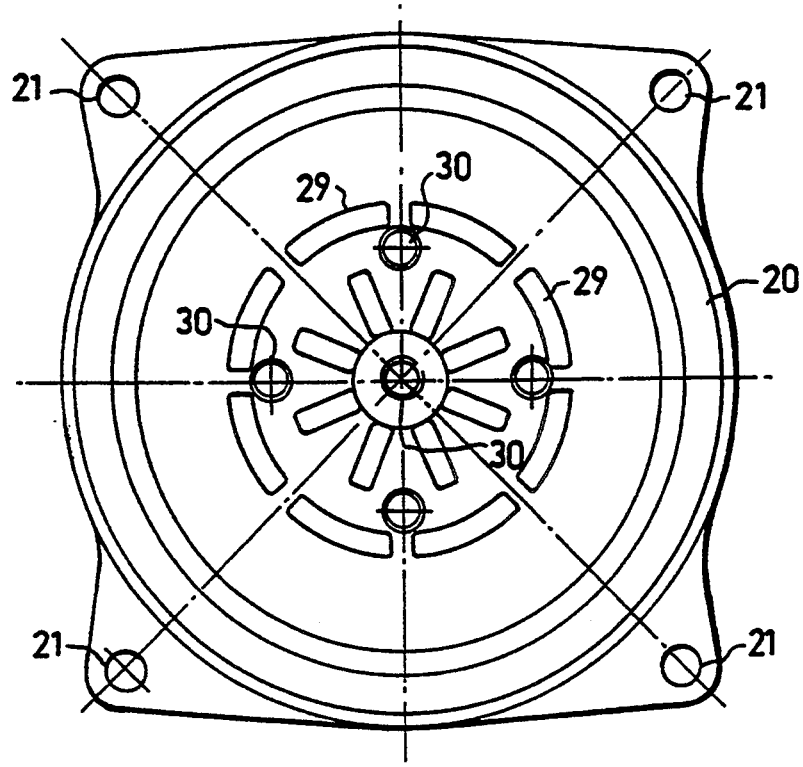
FIG. 4 is a bottom view illustrating the cover in the valve of FIGS. 1 and 2.

The valve illustrated in FIGS. 1-4 of the drawings comprises a housing, generally designated 2, formed with an inlet 4, an outlet 6, and a passageway 8 circumscribed by a circular valve seat 10 for the flow of fluid, e.g., water, from the inlet to the outlet. Housing 2 further includes a valve member, generally designated 12, disposed within the housing 2 and displaceable towards or away from the valve seat 10 to control the flow of the fluid therethrough. Where the valve is in a closed position, valve member 12 engages seat 10 to seal it closed; and where the valve is a regulator valve, valve member 12 would be displaceable towards and away from seat 10 so as to regulate the flow of the fluid therethrough. The regulation may be either in response to flow if the valve effects flow regulation, or in response to pressure if the valve effects pressure regulation.

Valve member 12 is constituted of two main components, namely a diaphragm 14 of elastomeric material, and an insert 16 of rigid material, such as metal.

Diaphragm 14 is a single unit integrally formed with an outer peripheral section 14a for securing the diaphragm within the housing; a valve-closer section 14b displaceable with respect to the valve seat 10 for controlling the flow therethrough; an intermediate flexible section 14c permitting the displacement of section 14b; and a cylindrical guiding section 14d between sections 14b and 14c. It further includes a central circular projection or stem 14e, of frusto-conical configuration, projecting from the inner face of section 14b. As clearly seen in FIGS. 1 and 2, the valve seat 10 is of a smaller diameter than that of the cylindrical guiding section 14d of the diaphragm.

Diaphragm 14 is further formed with a bevelled outer surface, as shown at 14f, which improves the seal effected upon seating diaphragm section 14b against the valve seat 10, as will be described below.

The rigid insert 16 is formed with a cylindrical side wall 16a engaging the inner surface of section 14d of the diaphragm; a circular end wall 16b engaging the inner surface of diaphragm section 14b; and a central opening 16c for receiving the central projection 14e of the diaphragm.

Housing 2 further includes a cover or bonnet 20 which engages the outer peripheral section 14a of the diaphragm 14 and secures it, e.g., by bolts passing through openings 21 (FIG. 3) in a flange 22 formed in the housing around an opening in the housing to receive the diaphragm. The housing further includes a cylindrical guiding surface 24 between the opening defined by flange 22 and the valve seat 10, and engageable with the outer surface of the cylindrical guiding section 14d of the diaphragm.

Cover 20 thus defines a chamber 26 between it and the valve member 12. A spring 28 is disposed within this chamber and urges the valve member 12, and particularly its diaphragm 14, to the closed position against seat 10, as shown in FIG. 1. The inner face of cover 20 is formed with a plurality of ribs 29 for limiting the inward movement of diaphragm 14 when moved to its open position, as shown in FIG. 2.

Cover 20 further includes one or more ports 30 which may be connected via a line 31 to a pilot valve, such as shown at 32 in FIG. 1, for controlling the pressure within chamber 26. The pressure within that chamber, as well as the force of spring 28, are both resisted by the inlet pressure which is applied to the opposite face of diaphragm 14. In one position (the broken line position) of pilot valve 32, it connects its port 32a to port 32b, thereby applying the inlet pressure via lines 33 and 31 to the control chamber 26; and in another position of the pilot valve (the broken-line position), it connects control chamber 26 to the atmosphere via port 32c. When the valve is in its closed condition, it is held closed by the differential pressure across the valve which acts upon the differential areas of the diaphragm (diameter "D" minus diameter "d"), plus the force of the spring.

Housing 2 is further formed with a smoothly converging inlet throat 34 immediately upstream of the valve passageway 8, and a smoothly diffusing section 35 immediately downstream of the passageway. It will be seen in FIG. 1 that both the housing inlet 4 and the housing outlet 6 have a common axis 36. The axis of the throat section 33 is between 35° and 45°, preferably about 40°, with respect to the common axis 36 of the inlet and outlet.

Housing 2 is further formed with an annular flange 40 at its inlet 4 for attaching the housing to the upstream pipe, and another annular flange 42 at its outlet end 6 for attaching the housing to the downstream pipe.

The operation of the valve will now be described.

When pilot valve 32 is in the broken-line position illustrated in FIG. 1, port 32a is connected to the atmosphere via port 32c, and therefore control chamber 26 will be vented to the atmosphere. If the inlet 4 is not connected to a pressurized fluid, spring 28 will move valve member 12 to its closed position as illustrated in FIG. 1. If, however, pressurized fluid is applied to inlet 4, the inlet pressure applied to the upstream face of diaphragm 14 will be sufficient to overcome the force of spring 28, and will thereby move the valve to its open position.

Whenever it is desired to close the valve, pilot valve 32 is actuated to its full line position, connecting the inlet pressure to the control chamber 26 via ports 32b, 32a. This substantially balances the forces on the opposite sides of valve member 12, so that spring 28 is sufficient to start the valve member 12 to move to its closed position.

The movement of the valve member 12 towards the closed position is stabilized by the construction of diaphgram 14 and rigid insert 16 in the following respects:

During the closing movements of the valve member 12, the downstream pressure starts to drop as the valve member 12 moves closer to the valve seat 10. The differential pressure between that in chamber 26 and the outlet 6 thus displaces the resilient cylindrical guiding section 14d of the diaphragm 14 outwardly, pressing that section against the cylindrical guiding surface 24 of the housing. This action guides the downward movement of the diaphragm towards the valve seat 10 and restrains the diaphragm from slamming to close or from vibration. The rigid cylindrical side wall 16a of rigid insert 16 also restrains the diaphragm from lateral movement. The lateral movement of the diaphragm is further restrained by projection 14e of the diaphragm engaging the edge of the opening in end wall 16b of the rigid insert 16.

In addition, the upstream pressure within chamber 26 produces a concentration of forces at the juncture of the bevelled surface 14f of the diaphgram with respect to the remainder of the diaphragm section 14b. This produces an effective annular projection which engages the valve seat 10 thereby enhancing the seal between the diaphragm sealing section 14b and the valve seat. However, during normal flow, this annular projection is not produced and therefore cannot interfere with the flow through the valve passageway.

Further, the 40° angle between the axis 38 of the inlet throat 34 with respect to the inlet axis 36, and the smooth juncture of the inlet throat immediately upstream and downstream of the valve seat 10, greatly improve the flow characteristics of the fluid through the valve opening 8, reducing turbulence and decreasing the pressure drop though the valve, during the normal operation of the valve.

The foregoing advantages, particularly the improved diaphragm stabilized guiding characteristics, also apply when the valve is used to perform a flow-regulator or pressure-regulator function. The valve is controlled by the pressure in control chamber 26 applied by a pilot valve capable of providing a regulating pressure in chamber 26, rather than an on/off pressure. It will be appreciated that when the valve is used for regulation, section 14b of diaphragm 14 moves towards and away from valve seat 10 to control the rate of flow through passageway 8, rather than completely shutting-off the flow through that passageway.

Figure 5:
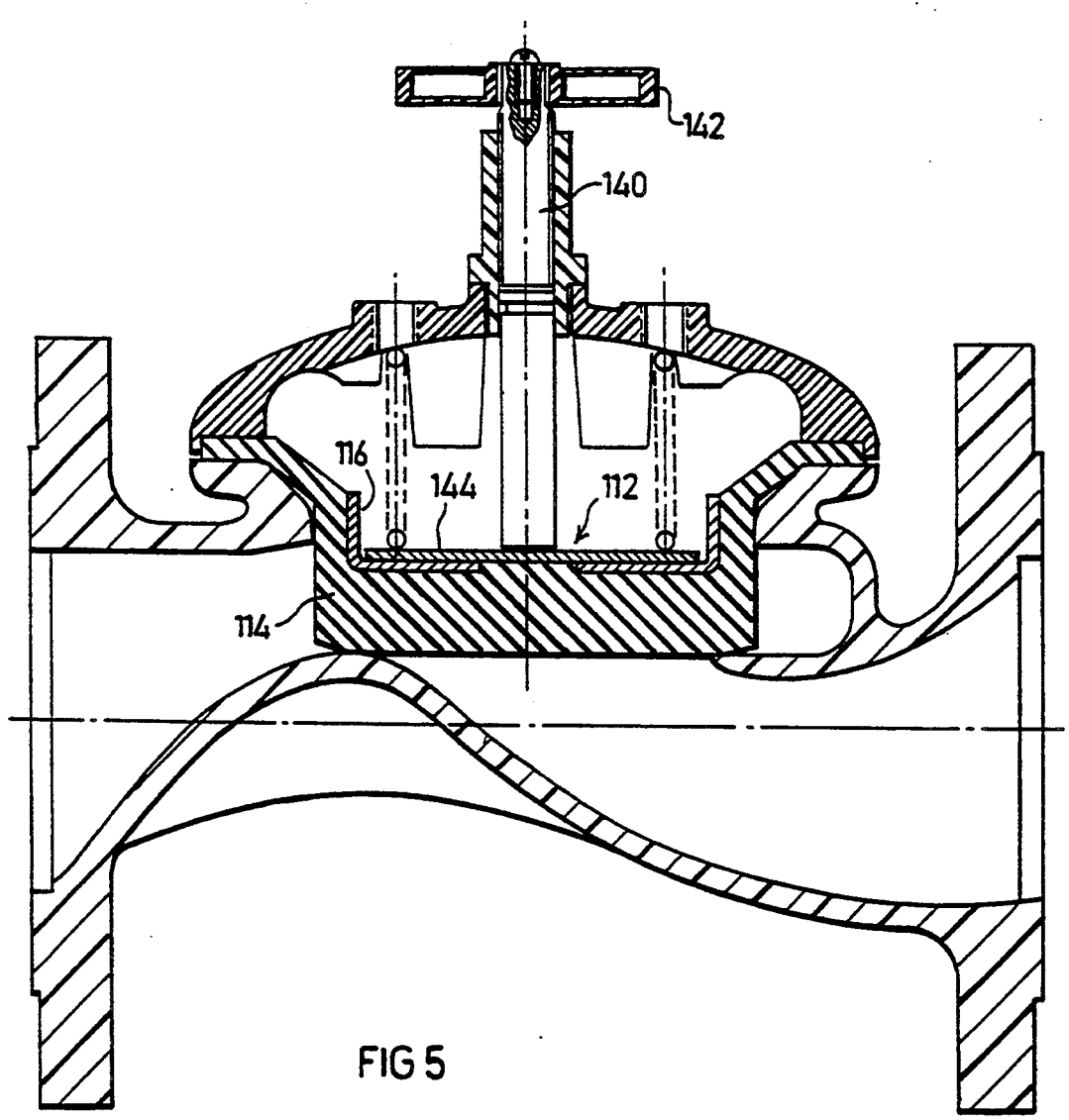
FIG. 5 illustrates a diaphragm valve of the type including a closing stem constructed in accordance with the invention.

The Valve of FIG. 5

FIG. 5 illustrates a diaphragm valve of the same construction as described above, except that the valve member, generally designated 112, may also be closed by a rotatable stem 140 rotatable by a handle 142 at one end and engageable with a bearing plate 144 provided on the inner surface of the rigid insert 116 of the valve member. Both the diaphragm 114, and the rigid insert 116, of the valve member 112, are constructed as described above, operate in substantially the same manner, and provide substantially the same advantages, except that the valve may also be closed and kept closed manually by rotating handle 142.

While the invention has been described with respect to two preferred embodiments, it will be appreciated that many variations, modifications and other applications of the invention may be made.

What is claimed is:

1. A diaphragm control valve, comprising:
   a housing having an inlet, an outlet, and a passageway circumscribed by a valve seat for the flow of fluid from the inlet to the outlet;
   and a valve member including a diaphragm within said housing and displaceable towards or away from said valve seat to control the flow therethrough;
   said diaphragm including an outer peripheral section secured over an opening in the housing in alignment with said valve seat, a valve-closer section displaceable with respect to the valve seat for controlling the flow therethrough, an intermediate flexible section permitting the displacement of said valve-closer section, and a cylindrical guiding section between the valve-closer section and the intermediate flexible section;
   said housing including a wall defining a control chamber between it and the diaphragm, and means for pressurizing said control chamber to thereby displace said valve-closer section of the diaphragm towards said valve seat;
   said housing further including a cylindrical guiding surface between said opening in the housing and said valve seat, and engageable with said cylindrical guiding section of the diaphragm for guiding the movement of said valve-closer section of the diaphragm;
   said cylindrical guiding section of the diaphragm being sufficiently resilient such that when the control chamber is pressurized to displace the valve-closure section towards the valve seat, the differential pressure between that in the control chamber and said valve outlet displaces said resilient guiding section outwardly to cause it to be firmly pressed against the cylindrical guiding section of the housing and thereby to restrain the valve-closure section from vibrating or from slamming to a closed position.

2. The valve according to claim 1, wherein said diaphragm is a single unit of elastomeric material integrally formed with said outer peripheral section, valve-closer section, intermediate flexible section, and cylindrical guiding section.

3. The valve according to claim 2, wherein said valve seat is of circular configuration and is of a smaller diameter than that of said cylindrical guiding section of the diaphragm.

4. The valve according to claim 1, wherein said housing wall defining said control chamber is a cover removably attached to the remainder of said housing.

5. The valve according to claim 1, further including a rotatable stem passing through a wall of said housing and bearing against said valve member for moving same towards or away from its valve seat.

6. The valve according to claim 1, wherein said diaphragm valve-closer section is thicker than its other sections so as to be substantially rigid and to provide a sealing surface with respect to said valve seat.

7. The valve according to claim 1, wherein said valve member further includes a rigid insert having a cylindrical side wall engaging the inner surface of said cylindrical guiding section of the diaphragm, and a circular end wall engaging the inner surface of said valve-closer section of the diaphgram.

8. The valve according to claim 7, wherein said inner surface of the valve-closer section of the diaphragm is formed with a central projection, and said end wall of the rigid insert is formed with a hole receiving said central projection.

9. The valve according to claim 8, wherein said central projection is of frusto-conical configuration.

10. The valve according to claim 1, wherein said valve-closer section of the diaphragm is of elastomeric material and is bevelled on its lower outer surface such that during closing movements of the valve-closer section, the pressure within said control chamber pressing said valve-closer section against the valve seat produces a concentration of forces at the juncture of said bevelled surface with respect to the remainder of the lower outer surface of said valve-closer section to produce an effective annular projection which engages the valve seat.

11. The valve according to claim 1, wherein said outer peripheral section of the diaphragm is secured between a flange formed in the valve housing and defining said opening therein, and a cover attached to said flange, said cover being formed with internal ribs for limiting the displacement of the diaphragm.

12. The valve according to claim 1, wherein said housing is formed with a converging throat section immediately upstream of the passageway, and with a diffuser section immediately downstream of said passageway.

13. The valve according to claim 12, wherein said housing inlet and outlet are on a common axis, and the axis of said throat section is 35°–45° with respect to said common axis.

14. The valve according to claim 13, wherein the axis of said inlet throat section is approximately 40° with respect to said common axis.

* * * * *